(12) United States Patent
Zhou

(10) Patent No.: US 11,114,133 B2
(45) Date of Patent: Sep. 7, 2021

(54) VIDEO RECORDING METHOD AND DEVICE

(71) Applicant: BEIJING MICROLIVE VISION TECHNOLOGY CO., LTD, Beijing (CN)

(72) Inventor: Yi Zhou, Beijing (CN)

(73) Assignee: BEIJING MICROLIVE VISION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/014,391

(22) Filed: Sep. 8, 2020

(65) Prior Publication Data

US 2020/0402543 A1 Dec. 24, 2020

Related U.S. Application Data

(63) Continuation of application No. PCT/CN2019/098460, filed on Jul. 30, 2019.

(30) Foreign Application Priority Data

Aug. 1, 2018 (CN) .......................... 201810865722.1
Aug. 1, 2018 (CN) .......................... 201810865723.6

(51) Int. Cl.
*G11B 27/00* (2006.01)
*G11B 27/19* (2006.01)
(Continued)

(52) U.S. Cl.
CPC ........ *G11B 27/19* (2013.01); *G11B 20/00007* (2013.01); *G11B 27/031* (2013.01); *H04N 19/42* (2014.11); *G11B 2020/00072* (2013.01)

(58) Field of Classification Search
USPC ................................ 386/201, 207, 343, 278
See application file for complete search history.

(56) References Cited

U.S. PATENT DOCUMENTS 6,801,707 B1 * 10/2004 Harumoto et al. ...... H04N 5/91
386/46
2001/0048721 A1 * 6/2001 Kato ........................ H04N 7/12
375/240.25
(Continued)

FOREIGN PATENT DOCUMENTS

CN 101296452 10/2008
CN 101483753 7/2009
(Continued)

OTHER PUBLICATIONS

International Search Report and Written Opinion dated Oct. 30, 2019 for PCT Patent Application No. PCT/CN2019/098460.
(Continued)

*Primary Examiner* — Daquan Zhao
(74) *Attorney, Agent, or Firm* — Thomas Horstemeyer, LLP

(57) ABSTRACT

Provided are a video recording method and apparatus. The video recording method includes: in response to detecting a resume recording instruction, determining duration of a video coded by a video coder, and setting playback progress of an audio player to the duration, where the resume recording instruction is used for instructing to continue collecting video data and continue playing target audio data by using the audio player; starting the audio player, where the video coder is started before the audio player; in the case of playing the target audio data to the playback progress, in response to collecting the video data, transmitting the collected video data to the video coder so that the video coder codes the collected video data.

20 Claims, 6 Drawing Sheets

(51) Int. Cl.
*H04N 19/42* (2014.01)
*G11B 20/00* (2006.01)
*G11B 27/031* (2006.01)
*H04N 5/932* (2006.01)
*H04N 5/935* (2006.01)

(56) References Cited

U.S. PATENT DOCUMENTS

| | | | |
|---|---|---|---|
| 2001/0033741 A1 | 10/2001 | Miyashita | |
| 2004/0258395 A1 | 12/2004 | Harumoto et al. | |
| 2008/0012985 A1 | 1/2008 | Yu et al. | |
| 2008/0190271 A1 | 8/2008 | Taub et al. | |
| 2018/0122419 A1* | 5/2018 | Wayans | G11B 27/34 |

FOREIGN PATENT DOCUMENTS

| | | |
|---|---|---|
| CN | 101740084 | 6/2010 |
| CN | 102348086 | 2/2012 |
| CN | 103208298 | 7/2013 |
| CN | 103702041 | 4/2014 |
| CN | 104023192 | 9/2014 |
| CN | 104835520 | 8/2015 |
| CN | 105407379 | 3/2016 |
| CN | 105516485 | 4/2016 |
| CN | 105959776 | 9/2016 |
| CN | 106131475 | 11/2016 |
| CN | 106385525 | 2/2017 |
| CN | 106899880 | 6/2017 |
| CN | 107566769 | 1/2018 |
| CN | 107959873 | 4/2018 |
| CN | 109600562 | 4/2019 |
| CN | 109600660 | 4/2019 |

OTHER PUBLICATIONS

1st Search Report dated Nov. 23, 2019 for Chinese Patent Application No. 201810865722.1.
1st Office Action dated Dec. 3, 2019 for Chinese Patent Application No. 201810865722.1.
Supplementary Search Report dated May 25, 2020 for Chinese Patent Application No. 201810865722.1.
Supplementary Search Report dated Jun. 8, 2020 for Chinese Patent Application No. 201810865722.1.
1st Search Report dated Aug. 22, 2019 for Chinese Patent Application No. 201810865723.6.
1st Office Action dated Aug. 29, 2019 for Chinese Patent Application No. 201810865723.6.
2nd Office Action dated Nov. 18, 2019 for Chinese Patent Application No. 201810865723.6.

* cited by examiner

VIDEO RECORDING METHOD AND DEVICE

CROSS-REFERENCE TO RELATED APPLICATIONS

This is continuation of International Patent Application No. PCT/CN2019/098460, filed on Jul. 30, 2019, which is based on and claims priority to Chinese patents application No. 201810865723.6 and application No. 201810865722.1 filed with the CNIPA on Aug. 1, 2018, disclosures of which are incorporated herein by reference in their entirety.

TECHNICAL FIELD

The embodiments of the present application relate to the technical field of computers and, for example, to a video recording method and apparatus.

BACKGROUND

In soundtrack video recording, an audio (a soundtrack) is usually played while a video is collected by a camera. For example, singing actions performed by a user are recorded while a song is played, and the song is used as background music for the recorded video. In an application having a video recording function, audio and video unsynchronization is common in the recorded soundtrack video.

In response to recording the soundtrack video in sections, a related way is usually to start a video coder and an audio player at the same time after detecting a resume recording instruction, so as to code video data by using the video coder and continue playing audio data by using the audio player.

SUMMARY

The embodiments of the present application provide a video recording method and apparatus.

An embodiment of the present application provides a video recording method. The method includes: in response to detecting a resume recording instruction, determining duration of a video coded by a video coder, and setting playback progress of an audio player to the duration, where the resume recording instruction is used for instructing to continue collecting video data and continue playing target audio data by using the audio player; starting the audio player, where the video coder is started before the audio player is started; in the case of playing the target audio data to the playback progress, in response to collecting the video data, transmitting the collected video data to the video coder so that the video coder codes the collected video data.

An embodiment of the present application provides a video recording apparatus. The apparatus includes a setting unit, a first starting unit, a transmission unit and a second starting unit. The setting unit is configured to, in response to detecting a resume recording instruction, determine duration of a video coded by a video coder, and set playback progress of an audio player to the duration, where the resume recording instruction is used for instructing to continue collecting video data and continue playing target audio data by using the audio player. The first starting unit is configured to start the audio player. The transmission unit is configured to, in the case of playing the target audio data to the playback progress and in response to collecting the video data, transmit the collected video data to the video coder so that the video coder codes the collected video data.

An embodiment of the present application further provides a terminal device. The terminal device includes one or more processors and a storage apparatus. The storage apparatus is configured to store one or more programs. When executing the one or more programs, the one or more processors perform the video recording method of any embodiment.

An embodiment of the present application further provides a computer-readable medium. The computer-readable medium stores computer programs. When executing the computer programs, a processor performs the video recording method of any embodiment.

DETAILED DESCRIPTION

Figure 1:
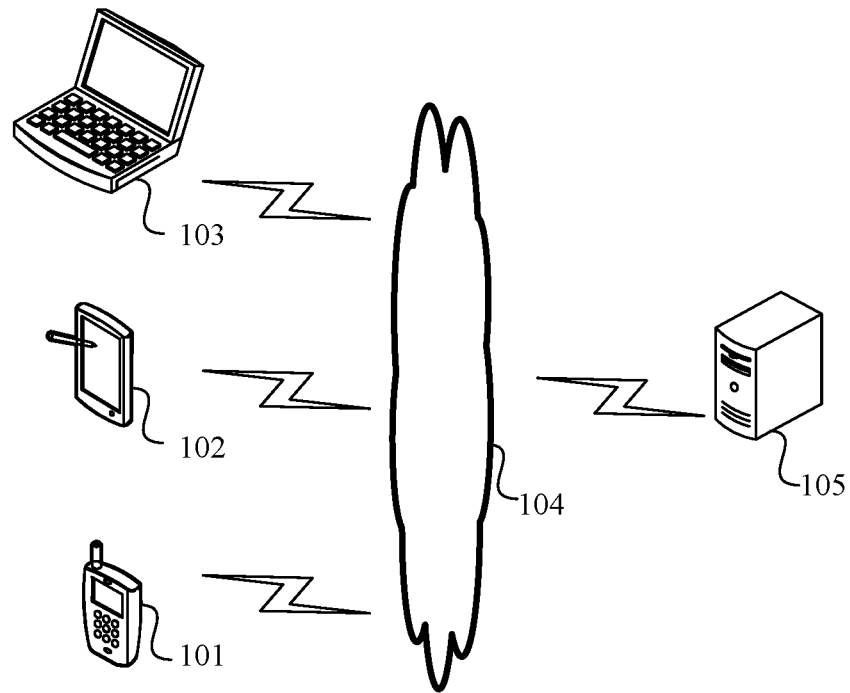
FIG. 1 is a schematic diagram of a system architecture according to an embodiment of the present application.

The present application will be described below in conjunction with drawings and embodiments. It is to be understood that the embodiments set forth below are intended to illustrate but not to limit the present application. Additionally, it is to be noted that, for ease of description, only a part, not all, related to the present application is illustrated in the drawings.

The present application will be described hereinafter in detail with reference to the drawings and in conjunction with the embodiments.

FIG. 1 is a schematic diagram of a system architecture according to an embodiment of the present application. FIG. 1 illustrates an exemplary system architecture 100 where a video recording method or a video recording apparatus of the present application is applicable.

As shown in FIG. 1, the system architecture 100 may include a terminal device 101, a terminal device 102, a terminal device 103, a network 104 and a server 105. The network 104 is used for providing a medium for communication links between the terminal device 101, the terminal device 102, the terminal device 103 and the server 105. The network 104 may include networks of any connection types, such as wired communication links, wireless communication links, fiber optic cables etc.

A user may interact with the server 105 via the network 104 by using the terminal device 101, the terminal device 102 or the terminal device 103, so as to receive or send messages (such as audio and video data upload requests and audio data acquisition requests). The terminal device 101, the terminal device 102 and the terminal device 103 may each be installed with a variety of communication client applications, such as a video recording application, an audio playing application, a video coding application, an instant messaging tool, a mailbox client, social platform software, etc.

The terminal device 101, the terminal device 102 and the terminal device 103 may each be hardware or software. In the case of hardware, the terminal device 101, the terminal device 102 and the terminal device 103 may be a variety of electronic devices that each has a display screen and can implement video recording and audio playing, which include, but are not limited to, a smart phone, a tablet computer, a laptop computer, a desktop computer, etc. In the case of software, the terminal device 101, the terminal device 102 and the terminal device 103 may be installed in the electronic devices listed above. The terminal device 101, the terminal device 102 and the terminal device 103 may be implemented as multiple types of software or multiple software modules (for example, for providing distributed services), or implemented as a single type of software or a single software module, which is not specifically limited here.

The terminal device 101, the terminal device 102 and the terminal device 103 may each be equipped with an image collection apparatus (for example, a camera) to collect video data. In an embodiment, the smallest visual unit that forms a video is a frame. Each frame is a static image. The dynamic video is formed by combining time-continuous frame sequences together. In an embodiment, the terminal device 101, the terminal device 102 and the terminal device 103 may each be equipped with an apparatus (for example, a speaker) configured to convert an electrical signal into sound, so as to play the sound. In an embodiment, the audio data is data obtained by performing analog-to-digital conversion (ADC) on an analog audio signal at a certain frequency. Audio data playing is a process of performing the ADC on a digital audio signal to restore the digital audio signal to the analog audio signal, converting the analog audio signal (where the analog audio signals is the electrical signal) into the sound and outputting the sound.

The terminal device 101, the terminal device 102 and the terminal device 103 may each collect the video data by using the image acquisition apparatus (for example, the camera) equipped on the respective terminal device, and code the video data by using a video coder equipped on the respective terminal device. In an embodiment, the terminal device 101, the terminal device 102 and the terminal device 103 may each play the audio data by using an audio player equipped the respective terminal device. The terminal device 101, the terminal device 102 and the terminal device 103 may each control and set the video coder, the audio player and other components, or perform other processing.

The server 105 may be a server that provides a variety of services, for example, the server 105 is a backend server that provides support for video recording applications installed on the terminal device 101, the terminal device 102 and the terminal device 103. The backend server may analyze and store received audio and video data upload requests and other data, or perform other processing. The backend server may further receive audio and video data acquisition requests sent by the terminal device 101, the terminal device 102 and the terminal device 103, and feed audio and video data indicated by the audio and video data acquisition requests back to the terminal device 101, the terminal device 102 and the terminal device 103.

In an embodiment, the server 105 may be hardware or software. In the case of hardware, the server 105 may be implemented as a distributed server cluster composed of multiple servers, or implemented as a single server. In the case of software, the server 105 may be implemented as multiple types of software or multiple software modules (for example, for providing distributed services), or implemented as a single type of software or a single software module; which is not specifically limited here.

In this embodiment, the video recording method provided in this embodiment of the present application is generally performed by the terminal device 101, the terminal device 102 and the terminal device 103. Accordingly, the video recording apparatus is generally disposed in the terminal device 101, the terminal device 102 and the terminal device 103.

It is to be understood that the number of terminal devices, networks and servers in FIG. 1 is only illustrative. According to implementation needs, there may be any number of terminal devices, networks and servers.

Figure 2:
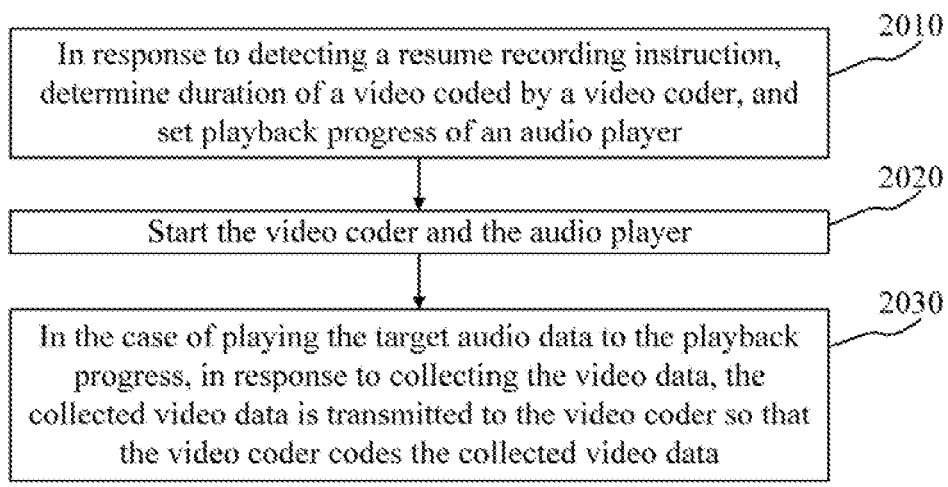
FIG. 2 is a flowchart of a video recording method according to an embodiment of the present application.

Still referring to FIG. 2, FIG. 2 is a flowchart of a video recording method according to an embodiment of the present application. The video recording method includes the steps described below.

In step 2010, in response to detecting a resume recording instruction, duration of a video coded by a video coder is determined, and playback progress of an audio player is set to the duration.

In this embodiment, a performing agent (such as the terminal device 101, the terminal device 102 or the terminal device 103 shown in FIG. 1) of the video recording method may acquire and store target audio data in advance. In an embodiment, the target audio data may be audio data specified by a user in advance as a soundtrack of a video, for example, the target audio data is the audio data corresponding to a specified song. The performing agent may be equipped or deployed with the video coder. In an embodiment, the above video coder may be configured to code video data. In this embodiment, video coding refers to a way to convert a file of a certain video format into a file of another video format by using a specific compression technique. The video coder may be in the form of software (such as a certain component or a certain code module) or hardware, which is not limited here.

In response to detecting the resume recording instruction, the duration of the video coded by the video coder is determined, and the playback progress of the audio player is set to the duration. In this embodiment, the resume recording instruction may be used for instructing to continue collecting video data and to continue playing the target audio data by using the audio player. In an embodiment, before the resume recording instruction is triggered, the performing agent may store a video that is pre-recorded and has not been completely recorded. In this embodiment, the pre-recorded video has been coded by the video coder. The performing agent may determine the duration of the video coded by the video coder. In an embodiment, during the recording each time, the duration of the video coded by the video coder may be determined in the following manner: firstly, start time and stop time for transmitting data to the video coder during the recording this time are determined; then, the difference between the stop time and the start time is determined as the duration of the video coded by the video coder during the recording this time. In an embodiment, the duration may be regarded as duration of a video that has been successfully recorded during the recording this time. The duration of the coded video during the recording each time is summed to obtain the duration of the video coded by the video coder.

In an embodiment, the performing agent may use other methods to determine the duration of the coded video, which is not repeated here.

In an embodiment, if the performing agent does not store the video that is pre-recorded and has not been completely coded, that is, the recording this time is for a first segment of video, then the playback progress may be directly set to 0. In this case, the playing starts from a start position of the target audio data.

In an embodiment, the audio data is data obtained after digitization of a sound signal. The digitization process of the sound signal is a process of converting the continuous analog audio signal into a digital audio signal at a certain frequency to obtain the audio data. Generally, the digitization process of the sound signal includes three steps: sampling, quantization and coding. The sampling refers to replacing the original time-continuous signal with a sequence of signal sample values at certain time intervals. The quantization refers to using finite amplitude to approximately indicate an original amplitude value that continuously varies with the time, and converting the continuous amplitude of the analog signal into a limited number of discrete values at certain time intervals. The coding refers to representing the quantized discrete values with binary numbers according to a certain rule. In an embodiment, pulse code modulation (PCM) may convert the sampled, quantized and coded analog audio signal into digitized audio data. Therefore, the target audio data may be a data stream of a PCM coding format, and a file format recording the target audio data may be a way format. In an embodiment, the file format recording the target audio data may be of another format, such as an mp3 format, an ape format, etc. In this case, the target audio data may be data of another coding format (such as advanced audio coding (AAC) or another lossy compression format), which is not limited to the PCM coding format. The performing agent may perform format conversion on the file recording the target audio data, and convert the file into the way format. The target audio data in the converted file is a data stream of the PCM coding format.

Generally, the performing agent may be installed with a video recording application. This video recording application may support recording a soundtrack video. The soundtrack video may be a video where the audio data is played while the video data is collected. The sound in the recorded soundtrack video is the sound corresponding to the audio data. For example, singing actions performed by a user are recorded while the song is played, and the song is used as background music for the recorded video. The video recording application may support recording the soundtrack video continuously and recording the soundtrack video in sections. In the case of recording the soundtrack video in sections, the user may firstly click a recording button to record a first segment of video. Then, the user clicks the recording button again to trigger a pause recording instruction. Next, the user clicks the recording button again to trigger the resume recording instruction, so as to record a second segment of video. After that, the user clicks the recording button again to trigger the pause recording instruction. The rest can be performed in the same manner. In an embodiment, a recording instruction, the pause recording instruction and the resume recording instruction may be triggered in other manners. For example, each segment of video may be recorded by pressing the recording button for a long time. When the recording button is released, the pause recording instruction is triggered. Details are not described here again.

In step 2020, the video coder and the audio player are started in turn.

In this embodiment, the performing agent may be equipped or deployed with the audio player. In this embodiment, the audio player is configured to play the audio data. In this embodiment, audio playing refers to a process of performing digital-to-analog conversion on the digitized audio data to restore the digitized audio data to an analog audio signal. The audio player may be in the form of software (such as a certain component or a certain code module) or hardware, which is not limited here.

In this embodiment, after step 2010, the performing agent may start the video coder and the audio player in turn. That is, the video coder is firstly started. After the video coder is successfully started, the audio player is started. It is to be noted that if the audio player is firstly started and then the video coder is started, or if the audio player and the video coder are started at the same time, then the video coder may be not already started successfully in the case of playing the target audio data to the playback progress, and thereby resulting in the playing of the target audio data being out of synchronization with the coding of the video data. However, the manner of starting the audio player after successfully starting the video coder can avoid this situation. In this embodiment, the performing agent may control the start or the stop of the video coder and an audio decoder.

In step 2030, in the case of playing the target audio data to the playback progress, in response to collecting the video data, the collected video data is transmitted to the video coder so that the video coder codes the collected video data.

In this embodiment, in the case of playing the target audio data to the playback progress, in response to collecting the video data, the collected video data may be transmitted to the video coder so that the video coder codes the collected video data. Therefore, after the target audio data is played to the playback progress, the video data coding may be officially started, so that the audio data playing is in synchronization with the video data coding, thereby improving the effect of audio and video synchronization during the soundtrack video recording.

In an embodiment, the performing agent may be equipped with an image acquisition apparatus, for example, a camera. The performing agent may use the camera to collect the video data.

In an embodiment, before the target audio data is played to the playback progress, in response to collecting the video data, the performing agent may delete the collected video data. In an embodiment, the performing agent may use the camera to collect the video data. Before step 2010, that is, before the resume recording instruction is detected, the camera may be in an on state or an off state. If the camera is in the on state, images may be continuously captured, but the captured images are neither transmitted to the video coder nor stored. The captured images may be discarded (that is, frames are dropped) until the target audio data is played to the playback progress. If the camera is in the off state before the resume recording instruction is detected, then after the resume recording instruction is detected, the camera may be started to capture images. In this case, the captured frames are also dropped until the target audio data is played to the playback progress.

In an embodiment, the video recording method further includes the following step: in response to detecting the stop recording instruction, the transmission for the collected video data to the video coder stops, and the audio player is controlled to stop playing. Then, the video coder is controlled to stop coding.

In an embodiment, after the video coder is controlled to stop coding, the video recording method may further include that total duration of video data coded by the video coder is firstly determined. In this embodiment, the total duration of the coded video data is total duration of the currently recorded video data. Then, the total duration may be determined as final playback progress of the audio player. In this embodiment, the coded video data includes video data that has been recorded before step 2010.

In an embodiment, after the total duration is determined as the final playback progress of the audio player, the video recording method may further include that: firstly, played target audio data indicated by the final playback progress is taken as a target audio data interval, and the target audio data interval is extracted. In this embodiment, a play end position of the target audio data corresponding to the final playback progress may be determined. An interval formed by a play start position and the play end position of the target audio data is taken as the target audio data interval, and the target audio data interval is extracted. Then, the coded video data and the target audio data interval may be stored. In an embodiment, the target audio data interval and the coded video data may be respectively stored into two files, and a mapping between the two files may be established. In an embodiment, the target audio data interval and the coded video data may be stored into the same file.

In an embodiment, the video recording method may further include: in response to detecting the resume recording instruction, setting pre-established coding identification to a first preset value (such as "NO", "N" or "0"). In this embodiment, the first preset value is used for instructing to delete the currently collected video data.

In an embodiment, the video recording method may further include: in the case of playing the target audio data to the above playback progress, setting the pre-established coding identification to a second preset value (such as "YES", "Y" or "1"). In this embodiment, the second preset value is used for instructing to transmit the currently collected video data to the video coder.

In an embodiment, the video recording method may further include: in response to detecting the stop recording instruction, setting the coding identification to the first preset value.

Figure 3:
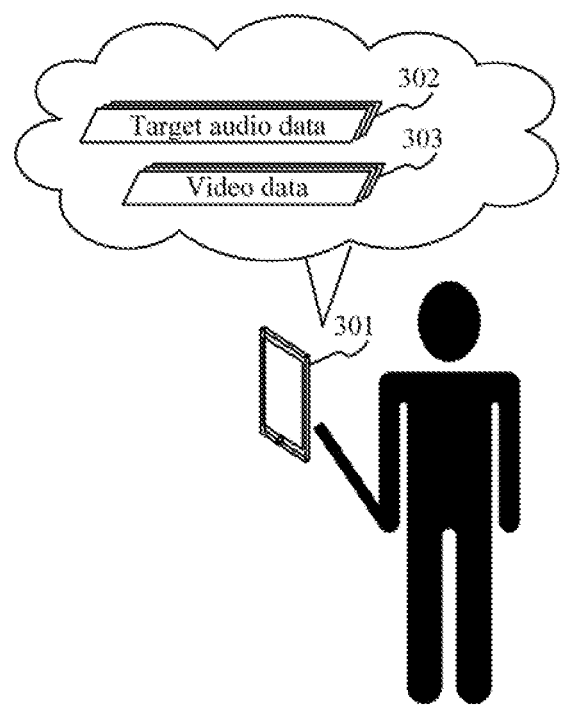
FIG. 3 is a schematic diagram of an application scenario of a video recording method according to an embodiment of the present application.

Still referring to FIG. 3, FIG. 3 is a schematic diagram of an application scenario of a video recording method according to an embodiment of the present application. In the application scenario of FIG. 3, a user holds a terminal device 301 to record a soundtrack video. A short video recording application operates in the terminal device 301. The user selects a certain soundtrack (for example, the song "Little Apple") in the interface of the short video recording application to record the soundtrack video in sections. The soundtrack corresponds to target audio data 302. After a certain segment of video is completely recorded, the user clicks a soundtrack video recording button and triggers a resume recording instruction. After detecting the resume recording instruction, the terminal device 301 sets the playback progress of an audio player to the duration of a video coded by a video coder. Then, the video coder and the audio player are started in turn. In the case of playing the target audio data to the playback progress, in response to collecting video data 303, the collected video data is transmitted to the video coder so that the video coder codes the collected video data.

According to the method provided by this embodiment of the present application, after the resume recording instruction is detected, the playback progress of the audio player is set to the duration of the video coded by the video coder; then, the video coder and the audio player are started in turn; in the case of playing the target audio data to the playback progress, in response to collecting the video data, the collected video data is transmitted to the video coder so that the video coder codes the collected video data. Thereby, the duration of the video coded by the video coder is set to the playback progress of the audio player, thus avoiding audio and video unsynchronization for the recorded video caused by the deviation in playback progress. Meanwhile, the video coder is started in advance, and the collected video data is transmitted to the video coder in the case of playing the target audio data to the playback progress, so that the video data coding is in synchronization with the audio data playing, thereby improving the effect of audio and video synchronization during the soundtrack video recording.

Figure 4:
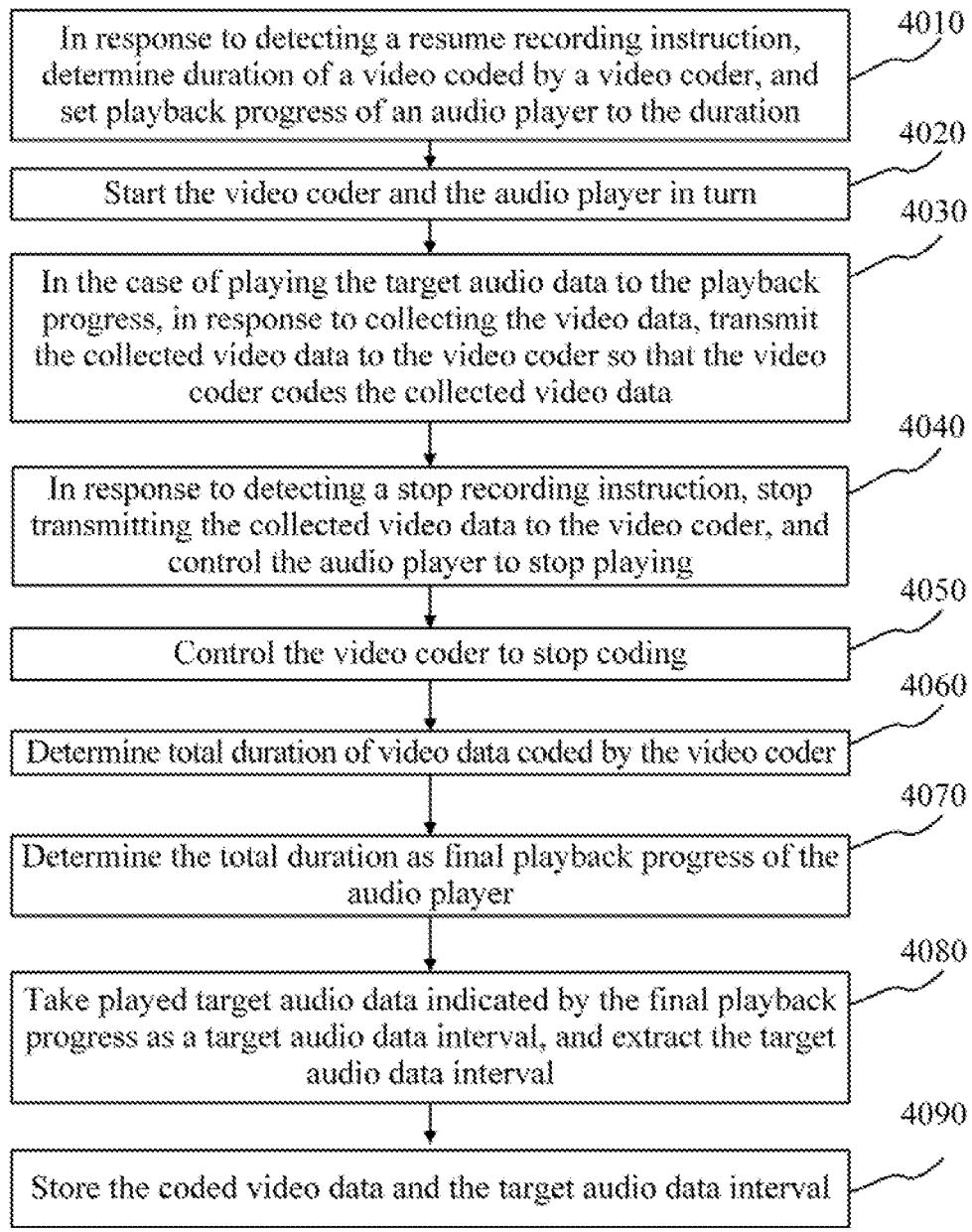
FIG. 4 is a flowchart of another video recording method according to an embodiment of the present application.

Still referring to FIG. 4, FIG. 4 is a flowchart of another video recording method according to an embodiment of the present application. The method provided by this embodiment includes the steps described below.

In step 4010, in response to detecting a resume recording instruction, duration of a video coded by a video coder is determined, and playback progress of an audio player is set to the duration.

In this embodiment, a performing agent (such as the terminal device 101, the terminal device 102 or the terminal device 103 shown in FIG. 1) of the video recording method may be equipped or deployed with the video coder. In response to detecting the resume recording instruction, the duration of the video coded by the video coder is determined, and the playback progress of the audio player is set to the duration. In this embodiment, the resume recording instruction may be used for instructing to continue collecting video data and continue playing the target audio data by using the audio player.

In this embodiment, in response to detecting the resume recording instruction, the performing agent may further set pre-established coding identification to a first preset value (such as "NO", "N" or "0"). In this embodiment, the first preset value may be used for instructing to delete the currently collected video data.

In this embodiment, the performing agent may be equipped with an image acquisition apparatus, for example, a camera. The performing agent may use the camera to collect the video data.

Before step 4010, that is, before the resume recording instruction is detected, the camera may have been in an on state. The performing agent may use the camera to continuously collect the video data. In response to collecting the video data (that is, collecting each frame), it is feasible to determine whether the value of the current coding identification is the first preset value. In response to determining that the value of the coding identification is the first preset value, the currently collected video data may be deleted (that is, frames are dropped) until it is determined that the value of the coding identification is a second preset value (such as "YES", "Y" or "1"). In this embodiment, the second preset value may be used for instructing to transmit the currently collected video data to the video coder.

In step 4020, the video coder and the audio player are started in turn.

In this embodiment, the performing agent may be equipped or deployed with the audio player. The performing agent may start the video coder and the audio player in turn.

That is, the video coder is firstly started. After the video coder is successfully started, the audio player is started.

In step 4030, in the case of playing the target audio data to the playback progress, in response to collecting the video data, the collected video data is transmitted to the video coder so that the video coder codes the collected video data.

In this embodiment, in the case of playing the target audio data to the playback progress, in response to collecting the video data, the collected video data may be transmitted to the video coder so that the video coder codes the collected video data. Therefore, after the target audio data is played to the playback progress, the video data coding may be officially started, so that the audio data playing is in synchronization with the video data coding, thereby improving the effect of audio and video synchronization during the soundtrack video recording.

In an embodiment, in the case of playing the target audio data to the playback progress, the performing agent may further set the coding identification to the second preset value to instruct to transmit the currently collected video data to the video coder in the case of collecting the video data.

In step 4040, in response to detecting a stop recording instruction, the transmission for the collected video data to the video coder stops, and the audio player is controlled to stop playing.

In this embodiment, in response to detecting the stop recording instruction, the performing agent may stop transmitting the collected video data to the video coder. Meanwhile, the audio player is controlled to stop playing.

In an embodiment, in response to detecting the stop recording instruction, the performing agent may further set the coding identification to the first preset value, so as to instruct to discard continuously-captured video in the case of continuing capturing video data.

In step 4050, the video coder is controlled to stop coding.

In this embodiment, after stopping transmitting the collected video data to the video coder and controlling the audio player to stop playing, the performing agent may control the video coder to stop coding. That is, the video coder stops.

In step 4060, total duration of video data coded by the video coder is determined.

In this embodiment, after controlling the video coder to stop coding, the performing agent may determine the total duration of the video data coded by the video coder. In this embodiment, the total duration of the coded video data is the total duration of video data that has been recorded currently. The coded video data includes video data that has been recorded before step 4010.

In step 4070, the total duration is determined as final playback progress of the audio player.

In this embodiment, the performing agent may determine the total duration as the final playback progress of the audio player.

In step 4080, played target audio data indicated by the final playback progress is taken as a target audio data interval, and the target audio data interval is extracted.

In this embodiment, the performing agent may firstly determine a play end position of the target audio data corresponding to the final playback progress. Then, an interval formed by a play start position and the play end position of the target audio data is determined as the target audio data interval. Finally, the target audio data interval is extracted.

In step 4090, the coded video data and the target audio data interval are stored.

In this embodiment, the performing agent may separately store the target audio data interval and the coded video data into two files, and a mapping between the two files may be established. In an embodiment, the target audio data interval and the coded video data may be stored into the same file.

As shown in FIG. 4, compared with the embodiment corresponding to FIG. 2, the video recording method in this embodiment embodies operations after the stop recording instruction is detected. In the case of stopping recording, the audio player stops playing the target audio data while the transmission for the video data to the video coder stops. In this way, the video coding and the audio playing synchronously stop, thereby further improving the effect of audio and video synchronization during the soundtrack video recording. Additionally, the method provided by this embodiment further highlights operations of audio and video data storage. In this way, audio and video files can be generated to facilitate subsequent playing, uploading and other processes.

Figure 5:
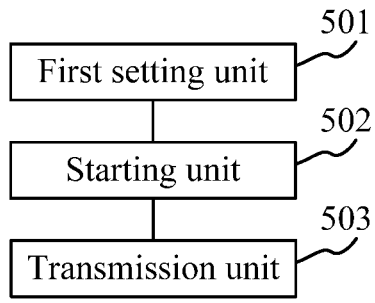
FIG. 5 is a structural diagram of a video recording apparatus according to an embodiment of the present application.

Still referring to FIG. 5, FIG. 5 is a structural diagram of a video recording apparatus according to an embodiment of the present application. As implementation of the method shown in FIG. 2 described below, an embodiment of the present application provides a video recording apparatus. The apparatus corresponds to the method embodiment shown in FIG. 2 and may be specifically applied to a variety of electronic devices.

As shown in FIG. 5, the video recording apparatus in this embodiment includes a first setting unit 501, a starting unit 502 and a transmission unit 503. The first setting unit 501 is configured to, in response to detecting a resume recording instruction, determine duration of a video coded by a video coder, and set playback progress of an audio player to the duration, where the resume recording instruction is used for instructing to continue collecting video data and continue playing target audio data by using the audio player. The starting unit 502 is configured to start the video coder and the audio player in turn. The transmission unit 503 is configured to, in the case of playing the target audio data to the playback progress and in response to collecting the video data, transmit the collected video data to the video coder so that the video coder codes the collected video data.

In an embodiment, the apparatus may further include a controlling unit (not shown in FIG. 5). The controlling unit may be configured to, in response to detecting a stop recording instruction, stop transmitting the collected video data to the video coder, control the audio player to stop playing, and control the video coder to stop coding.

In an embodiment, the apparatus may further include a first determination unit and a second determination unit (not shown in FIG. 5). The first determination unit may be configured to determine total duration of video data coded by the video coder. The second determination unit may be configured to determine the total duration as final playback progress of the audio player.

In an embodiment, the apparatus may further include an extraction unit and a storage unit (not shown in FIG. 5). The extraction unit may be configured to take played target audio data indicated by the final playback progress as a target audio data interval, and extract the target audio data interval. The storage unit is configured to store the coded video data and the target audio data interval.

In an embodiment, the apparatus may further include a deletion unit (not shown in FIG. 5). The deletion unit may be configured to, before playing the target audio data to the playback progress and in response to collecting the video data, delete the collected video data.

In an embodiment, the apparatus may further include a second setting unit (not shown in FIG. 5). The second setting unit may be configured to, in response to detecting the resume recording instruction, set pre-established coding identification to a first preset value. The first preset value is used for instructing to delete the currently collected video data.

In an embodiment, the apparatus may further include a third setting unit (not shown in FIG. 5). The third setting unit may be configured to, in the case of playing the target audio data to the playback progress, set the pre-established coding identification to a second preset value. The second preset value is used for instructing to transmit the currently collected video data to the video coder.

In an embodiment, the apparatus may further include a fourth setting unit (not shown in FIG. 5). The fourth setting unit may be configured to, in response to detecting a stop recording instruction, set the pre-established coding identification to the first preset value.

According to the apparatus provided by this embodiment of the present application, after detecting the resume recording instruction, the first setting unit 501 sets the playback progress of the audio player to the duration of the video coded by the video coder; then, the starting unit 502 starts the video coder and the audio player in turn; then in the case where it is determined that the target audio data is played to the playback progress, in response to collecting the video data, the transmission unit 503 transmits the collected video data to the video coder so that the video coder codes the collected video data. Thereby, the playback progress of the audio player may be set based on the duration of the video coded by the video coder, thus avoiding audio and video unsynchronization caused by the deviation in playback progress. Meanwhile, the collected video data is transmitted to the video coder in the case of playing the target audio data to the playback progress, so that the video data coding is in synchronization with the audio data playing, thereby improving the effect of audio and video synchronization during the soundtrack video recording.

Figure 6:
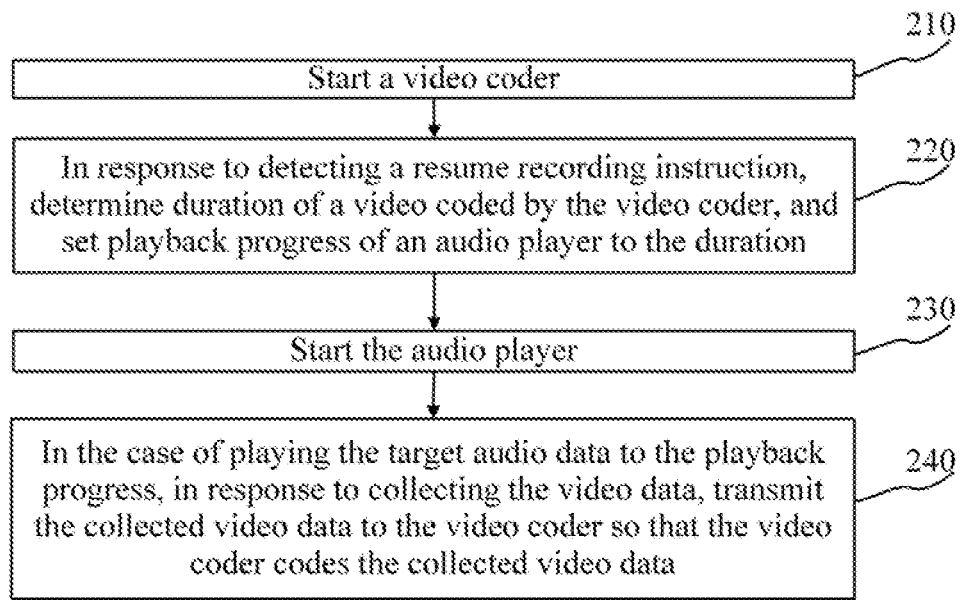
FIG. 6 is a flowchart of another video recording method according to an embodiment of the present application.

Still referring to FIG. 6, FIG. 6 is a flowchart of another video recording method according to an embodiment of the present application. The video recording method includes the steps described below.

In step 210, a video coder is started.

In this embodiment, a performing agent (such as the terminal device 101, the terminal device 102 or the terminal device 103 shown in FIG. 1) of the video recording method may be equipped or deployed with the video coder. The performing agent controls the start and the stop of the video coder. In this embodiment, the performing agent may start the video coder to prepare for the video recording by a user.

In this embodiment, the video coder may be used for coding video data. In this embodiment, video coding refers to a way to convert a file of a certain video format into a file of another video format by using a specific compression technique. The video coder may be in the form of software (such as a certain component or a certain code module) or hardware, which is not limited here.

In step 220, in response to detecting a resume recording instruction, duration of a video coded by the video coder is determined, and playback progress of an audio player is set to the duration.

In this embodiment, the performing agent may acquire and store target audio data in advance. In an embodiment, the target audio data may be audio data specified by the user in advance as a soundtrack of the video, for example, the target audio data is audio data corresponding to a specified song.

In response to detecting the resume recording instruction, the duration of the video coded by the video coder may be determined, and the playback progress of the audio player may be set to the duration. In this embodiment, the resume recording instruction may be used for instructing to continue collecting video data and continue playing the target audio data by using the audio player. In an embodiment, before the resume recording instruction is triggered, the performing agent may store a video that is pre-recorded and has not been completely recorded. In this embodiment, the pre-recorded video has been coded by the video coder. The performing agent may determine the duration of the video coded by the video coder. In an embodiment, during the recording each time, the duration of the video coded by the video coder may be determined in the following manner: firstly, start time and stop time for transmitting data to the video coder during the recording this time are determined; then, the difference between the stop time and the start time is determined as the duration of the video coded by the video coder during the recording this time. In an embodiment, the duration may be regarded as duration of a video that has been successfully recorded during the recording this time. The duration of the coded video during the recording each time is summed to obtain the duration of the video coded by the video coder. In an embodiment, the performing agent may use other methods to determine the duration of the coded video, which is not repeated here.

In this embodiment, the audio data is data obtained after digitization of a sound signal. The digitization process of the sound signal is a process of converting the continuous analog audio signal into a digital audio signal at a certain frequency to obtain the audio data. Generally, the digitization process of the sound signal includes three steps: sampling, quantization and coding. The sampling refers to replacing the original time-continuous signal with a sequence of signal sample values at certain time intervals. The quantization refers to using finite amplitude to approximately indicate an original amplitude value that continuously varies with the time, and converting the continuous amplitude of the analog signal into a limited number of discrete values at certain time intervals. The coding refers to representing the quantized discrete values with binary numbers according to a certain rule. In an embodiment, PCM may convert the sampled, quantized and coded analog audio signal into digitized audio data. Therefore, the target audio data may be a data stream of a PCM coding format, and a file format recording the target audio data may be of a way format. In an embodiment, the file format recording the target audio data may be of another format, such as an mp3 format, an ape format, etc. In this case, the target audio data may be data of another coding format (such as AAC or another lossy compression format), which is not limited to the PCM coding format. The performing agent may perform format conversion on the file recording the target audio data, and convert the file into the way format. A target audio data in the converted file is a data stream of the PCM coding format.

Generally, the performing agent may be installed with a video recording application. This video recording application may support recording a soundtrack video. The soundtrack video may be a video where the audio data is played while the video data is collected. The sound in the recorded soundtrack video is the sound corresponding to the audio data. For example, singing actions performed by a user are recorded while the song is played, and the song is used as background music for the recorded video. The video recording application may support recording the soundtrack video continuously and recording the soundtrack video in sections. In the case of recording the soundtrack video in sections, the user may firstly click a recording button to record a first segment of video. Then, the user clicks the recording button again to trigger a pause recording instruction. Next, the user clicks the recording button again to trigger the resume recording instruction, so as to record a second segment of video. After that, the user clicks the recording button again to trigger the pause recording instruction. The rest can be performed in the same manner. In an embodiment, a recording instruction, the pause recording instruction and the resume recording instruction may be triggered in other manners. For example, each segment of video may be recorded by pressing the recording button for a long time. When the recording button is released, the pause recording instruction is triggered. Details are not described here again.

In step 230, the audio player is started.

In this embodiment, the performing agent may be equipped or deployed with the audio player. In this embodiment, the audio player is configured to play the audio data. In this embodiment, audio playing refers to a process of performing digital-to-analog conversion on the digitized audio data to restore the digitized audio data to an analog audio signal. The video coder and the audio player may each be in the form of software (such as a certain component or a certain code module) or hardware, which is not limited here.

In this embodiment, after step 220, the performing agent may start the audio player. In this embodiment, the performing agent may control the start or the stop of the audio decoder.

In step 240, in the case of playing the target audio data to the playback progress, in response to collecting the video data, the collected video data is transmitted to the video coder so that the video coder codes the collected video data.

In this embodiment, in the case of playing the target audio data to the playback progress, in response to collecting the video data, the collected video data may be transmitted to the video coder so that the video coder codes the collected video data. Therefore, after the target audio data is played to the playback progress, the video data coding may be officially started, so that the audio data playing is in synchronization with the video data coding, thereby improving the effect of audio and video synchronization during the soundtrack video recording.

In an embodiment, the performing agent may be equipped with an image acquisition apparatus, for example, a camera. The performing agent may use the camera to collect the video data.

In an embodiment, before the target audio data is played to the playback progress, in response to collecting the video data, the performing agent may delete the collected video data. In an embodiment, the performing agent may use the camera to collect the video data. Before step 2010, that is, before the resume recording instruction is detected, the camera may be in an on state or an off state. If the camera is in the on state, images may be continuously captured, but the captured images are neither transmitted to the video coder nor stored. The captured images may be discarded (that is, frames are dropped) until the target audio data is played to the playback progress. If the camera is in the off state before the resume recording instruction is detected, then after the resume recording instruction is detected, the camera may be started to capture images. In this case, the captured frames are also dropped until the target audio data is played to the playback progress.

In an embodiment, the video recording method may further include the following step: in response to detecting the stop recording instruction, the transmission for the collected video data to the video coder stops, and the audio player is controlled to stop playing. Then, the video coder is controlled to stop coding.

In an embodiment, after the video coder is controlled to stop coding, the video recording method may further include that total duration of video data coded by the video coder is firstly determined. In this embodiment, the total duration of the coded video data is total duration of the currently recorded video data. In this embodiment, the coded video data includes video data that has been recorded before step 210. Then, the total duration may be determined as final playback progress of the audio player. Finally, the video coder may be started.

In an embodiment, after the total duration is determined as the final playback progress of the audio player, the video recording method may further include that: firstly, played target audio data indicated by the final playback progress is taken as a target audio data interval, and the target audio data interval is extracted. In this embodiment, a play end position of the target audio data corresponding to the final playback progress may be determined. An interval formed by a play start position and the play end position of the target audio data is taken as the target audio data interval, and the target audio data interval is extracted. Then, the coded video data and the target audio data interval may be stored. In an embodiment, the target audio data interval and the coded video data may be respectively stored into two files, and a mapping between the two files may be established. In an embodiment, the target audio data interval and the coded video data may be stored into the same file.

In an embodiment, before the video coder is started, the video recording method may further include setting pre-established coding identification to a first preset value (such as "NO", "N" or "0"). In this embodiment, the first preset value is used for instructing to delete the currently collected video data.

In an embodiment, the video recording method may further include: in the case of playing the target audio data to the playback progress, setting the pre-established coding identification to a second preset value (such as "YES", "Y" or "0"). In this embodiment, the second preset value is used for instructing to transmit the currently collected video data to the video coder.

In an embodiment, the video recording method may further include: in response to detecting the stop recording instruction, setting the coding identification to the first preset value.

Still referring to FIG. 3, in the application scenario of FIG. 3, a user holds a terminal device 301 to record a soundtrack video. A short video recording application operates in the terminal device 301. The user selects a certain soundtrack (for example, the song "Little Apple") in the interface of the short video recording application to record the score video in sections. The soundtrack corresponds to target audio data 302. After a certain segment of video has been recorded, the terminal device 301 firstly starts a video coder to prepare for the recording next time by the user. After the user clicks a soundtrack video recording button, a resume recording instruction is triggered. After detecting the resume recording instruction, the terminal device 301 sets playback progress of an audio player to duration of a video coded by a video coder. Then, the audio player is started. In the case of playing the target audio data to the playback progress, in response to collecting video data 303, the collected video data is transmitted to the video coder so that the video coder codes the collected video data.

According to the method provided by this embodiment of the present application, the video coder is started; after the resume recording instruction is detected, the playback progress of the audio player is set to the duration of the video coded by the video coder; then, the audio player is started; in the case of playing the target audio data to the playback progress, in response to collecting the video data, the collected video data is transmitted to the video coder so that the video coder codes the collected video data. Thereby, the duration of the video coded by the video coder may be set to the playback progress of the audio player, thus avoiding audio and video unsynchronization for the recorded video caused by the deviation in playback progress. Meanwhile, the video coder is started in advance instead of being started after the recording is resumed, so that the complexity of operations after the recording is resumed is reduced, thereby improving the efficiency for responding to the resume recording instruction triggered by the user. Meanwhile, the collected video data is transmitted to the video coder in the case of playing the target audio data to the playback progress, so that the video data coding is in synchronization with the audio data playing, thereby improving the effect of audio and video synchronization during the soundtrack video recording.

Figure 7:
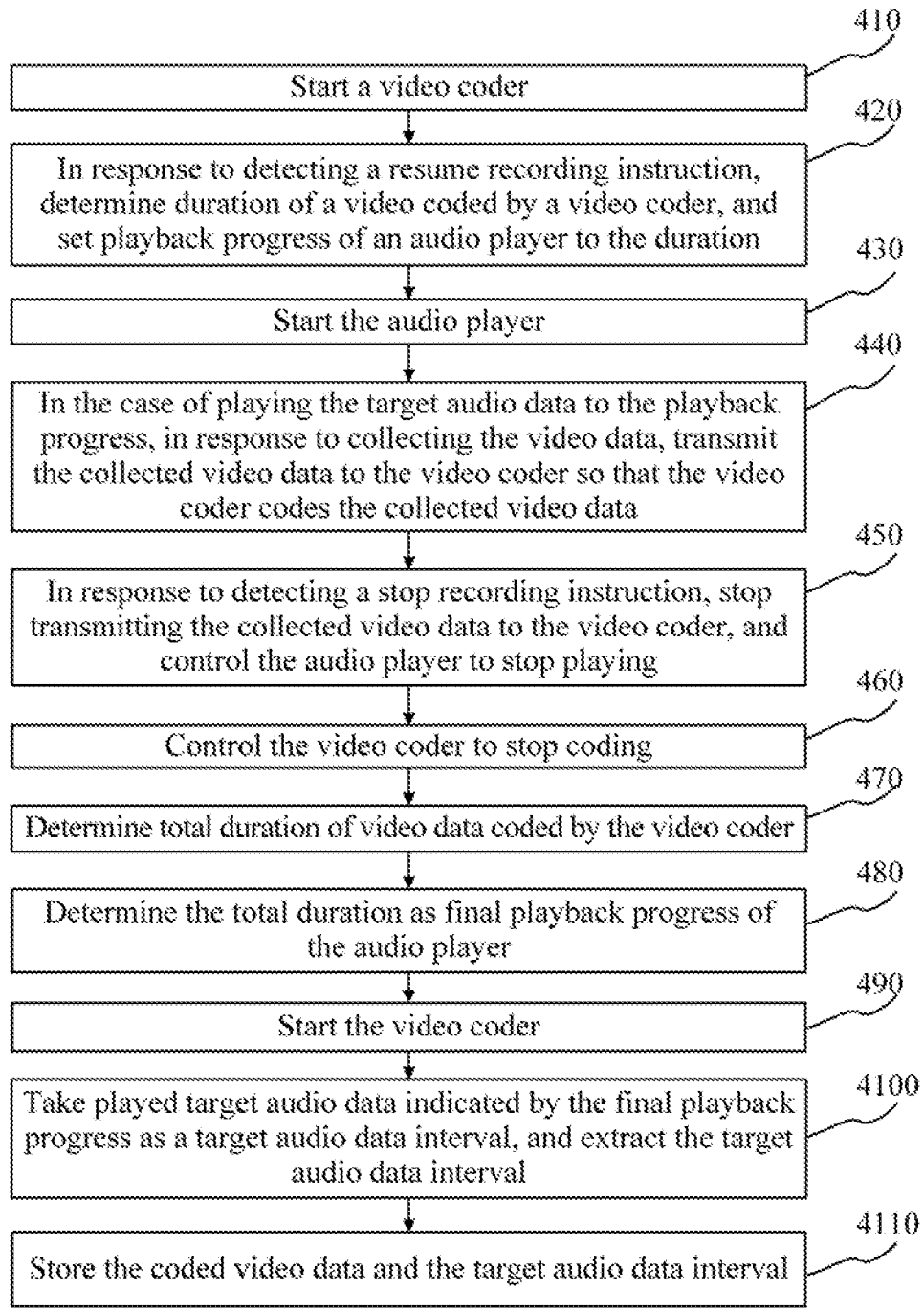
FIG. 7 is a flowchart of another video recording method according to an embodiment of the present application.

Still referring to FIG. 7, FIG. 7 is a flowchart of another video recording method according to an embodiment of the present application. The method provided by this embodiment includes the steps described below.

In step 410, a video coder is started.

In this embodiment, a performing agent (such as the terminal device 101, the terminal device 102 or the terminal device 103 shown in FIG. 1) of the video recording method may be equipped or deployed with the video coder. The performing agent controls the start or the stop of the video coder. In this embodiment, the performing agent may start the video coder.

In this embodiment, before starting the video coder, the performing agent may further set pre-established coding identification to a first preset value (such as "NO", "N" or "0"). In this embodiment, the first preset value is used for instructing to delete currently collected video data.

In an embodiment, the performing agent may be equipped with an image acquisition apparatus, for example, a camera. The performing agent may use the camera to collect the video data. Before step 410, that is, before the video coder is started, the camera may have been in an on state. The performing agent may use the camera to collect the video data. In response to collect the video data (that is, collecting each frame), it may be determined whether the value of current coding identification is the first preset value. In response to determining that the value of the coding identification is the first preset value, the currently collected video data may be deleted (that is, frames are dropped) until it is determined that the value of the coding identification is a second preset value (such as "YES", "Y" or "1"). In this embodiment, the second preset value may be used for instructing to transmit the currently collected video data to the video coder.

In step 420, in response to detecting a resume recording instruction, duration of a video coded by the video coder is determined, and playback progress of an audio player is set to the duration.

In this embodiment, in response to detecting the resume recording instruction, the performing agent may determine the duration of the video coded by the video coder and set the playback progress of the audio player to the duration. In this embodiment, the resume recording instruction may be used for instructing to continue collecting video data and continue playing the target audio data by using the audio player.

In step 430, the audio player is started.

In this embodiment, the performing agent may be equipped or deployed with the audio player. In this embodiment, the audio player is configured to play the audio data. After step 420, the performing agent may start the audio player. In this embodiment, the performing agent may control the start or the stop of the audio decoder.

In step 440, in the case of playing the target audio data to the playback progress, in response to collecting the video data, the collected video data is transmitted to the video coder so that the video coder codes the collected video data.

In this embodiment, in the case of playing the target audio data to the playback progress, in response to collecting the video data, the collected video data may be transmitted to the video coder so that the video coder codes the collected video data. Therefore, after the target audio data is played to the playback progress, the video data coding may be officially started, so that the audio data playing is in synchronization with the video data coding, thereby improving the effect of audio and video synchronization during the soundtrack video recording.

In an embodiment, in the case of playing the target audio data to the playback progress, the performing agent may further set the coding identification to the second preset value to instruct to transmit the currently collected video data to the video coder in the case of collecting the video data.

In step 450, in response to detecting a stop recording instruction, the transmission for the collected video data to the video coder stops, and the audio player is controlled to stop playing.

In this embodiment, in response to detecting the stop recording instruction, the performing agent may stop transmitting the collected video data to the video coder. Meanwhile, the audio player is controlled to stop playing.

In an embodiment, in response to detecting the stop recording instruction, the performing agent may further set the coding identification to the first preset value, so as to instruct to discard continuously-captured video data in the case of continuing capturing video data.

In step 460, the video coder is controlled to stop coding.

In this embodiment, after stopping transmitting the collected video data to the video coder and controlling the audio player to stop playing, the performing agent may control the video coder to stop coding. That is, the video coder stops.

In step 470, total duration of video data coded by the video coder is determined.

In this embodiment, after controlling the video coder to stop coding, the performing agent may determine the total duration of the video data coded by the video coder. In this embodiment, the coded video data includes video data that has been recorded before step 410.

In step 480, the total duration is determined as final playback progress of the audio player.

In this embodiment, the performing agent may determine the total duration as the final playback progress of the audio player.

In step 490, the video coder is started.

In this embodiment, after determining the final playback progress of the audio player, the performing agent may restart the video coder to facilitate the recording of the next segment of video.

In step 4100, played target audio data indicated by the final playback progress is taken as a target audio data interval, and the target audio data interval is extracted.

In this embodiment, the performing agent may firstly determine a play end position of the target audio data corresponding to the final playback progress. Then, an interval formed by a play start position and the play end position of the target audio data is determined as a target audio data interval. Finally, the target audio data interval is extracted.

In step 4110, the coded video data and the target audio data interval are stored.

In this embodiment, the performing agent may separately store the target audio data interval and the coded video data into two files, and a mapping between the two files may be established. In an embodiment, the target audio data interval and the coded video data may be stored into the same file.

As shown in FIG. 7, compared with the embodiment corresponding to FIG. 6, the video recording method in this embodiment embodies operations after the stop recording instruction is detected. In the case of stopping recording, the audio player stops playing the target audio data while the transmission for the video data to the video coder stops. In this way, the video coding and the audio playing synchronously stop, thereby further improving the effect of audio and video synchronization during the soundtrack video recording. Additionally, the method provided by this embodiment further highlights operations of audio and video data storage. In this way, audio and video files can be generated to facilitate subsequent playing, uploading and other processes.

Figure 8:
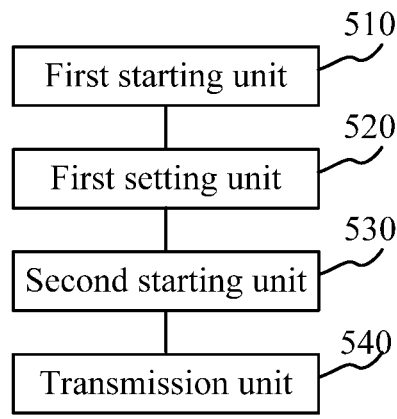
FIG. 8 is a structural diagram of another video recording apparatus according to an embodiment of the present application.

Still referring to FIG. 8, FIG. 8 is a structural diagram of another video recording apparatus according to an embodiment of the present application. As implementation of the methods shown in the drawings described above, an embodiment of the present application provides a video recording apparatus. The apparatus corresponds to the method embodiment shown in FIG. 6 and may be applied to a variety of electronic devices.

As shown in FIG. 8, the video recording apparatus in this embodiment includes a first starting unit 510, a first setting unit 520, a second starting unit 530 and a transmission unit 540. The first starting unit 510 is configured to start a video coder. The first setting unit 520 is configured to, in response to detecting a resume recording instruction, determine duration of a video coded by a video coder, and set playback progress of an audio player to the duration, where the resume recording instruction is used for instructing to continue collecting video data and continue playing target audio data by using the audio player. The second starting unit 530 is configured to start the audio player. The transmission unit 540 is configured to, in the case of playing the target audio data to the playback progress and in response to collecting the video data, transmit the collected video data to the video coder so that the video coder codes the collected video data.

In an embodiment, the apparatus may further include a controlling unit (not shown in FIG. 8). The controlling unit is configured to, in response to detecting a stop recording instruction, stop transmitting the collected video data to the video coder, control the audio player to stop playing, and control the video coder to stop coding.

In an embodiment, the apparatus may further include a first determination unit, a second determination unit and a third starting unit (not shown in FIG. 8). The first determination unit may be configured to determine total duration of video data coded by the video encoder. The second determination unit may be configured to determine the total duration as final playback progress of the audio player. The third starting unit may be configured to start the video coder.

In an embodiment, the apparatus may further include an extraction unit and a storage unit (not shown in FIG. 8). The extraction unit may be configured to take played target audio data indicated by the final playback progress as a target audio data interval, and extract the target audio data interval. The storage unit is configured to store the coded video data and the target audio data interval.

In an embodiment, the apparatus may further include a deletion unit (not shown in FIG. 8). The deletion unit is configured to, before the target audio data is played to the playback progress and in response to collecting the video data, delete the collected video data.

In an embodiment, the apparatus may further include a second setting unit (not shown in FIG. 8). The second setting unit may be configured to set pre-established coding identification to a first preset value before the video coder is started. The first preset value is used for instructing to delete the currently collected video data.

In an embodiment, the apparatus may further include a third setting unit (not shown in FIG. 8). The third setting unit may be configured to, in the case of playing the target audio data to the playback progress, set the encoding identification to a second preset value. The second preset value is used for instructing to transmit the currently collected video data to the video coder.

In an embodiment, the apparatus may further include a fourth setting unit (not shown in FIG. 8). The fourth setting unit may be configured to, in response to detecting the stop recording instruction, set the encoding identification to the first preset value.

According to the apparatus provided by this embodiment of the present application, the first starting unit 510 starts the video coder; after detecting the resume recording instruction, the first setting unit 520 sets the playback progress of the audio player to the duration of the video coded by the video coder; then, the second starting unit 530 starts the audio player; finally, in the case of playing the target audio data to the playback progress, in response to collecting the video data, the transmission unit 540 transmits the collected video data to the video coder so that the video coder codes the collected video data. Thereby, the duration of the video coded by the video coder may be set to the playback progress of the audio player, thus avoiding audio and video unsynchronization for the recorded video caused by the deviation in playback progress. Meanwhile, the video coder is started in advance so that the complexity of operations after the recording is resumed is reduced. The collected video data is transmitted to the video coder in the case of playing the target audio data to the playback progress, so that the video data coding is in synchronization with the audio data playing, thereby improving the effect of audio and video synchronization during the soundtrack video recording.

Figure 9:
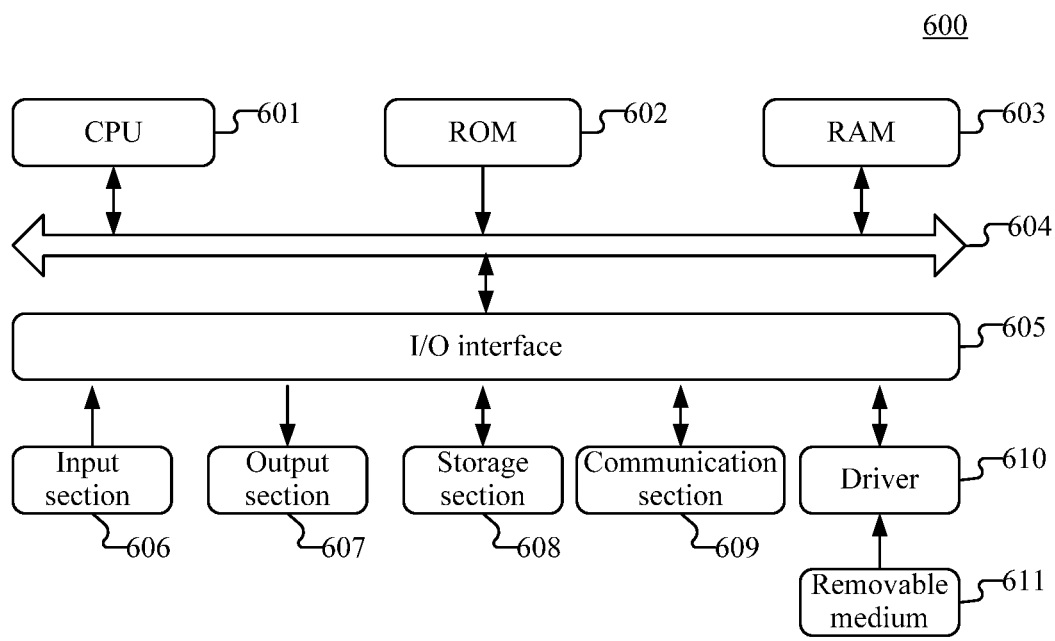
FIG. 9 is a structural diagram of a computer system of a terminal device according to an embodiment of the present application.

Referring to FIG. 9, FIG. 9 is a structural diagram of a computer system of a terminal device according to an embodiment of the present application. The terminal device shown in FIG. 9 is merely an example and not intended to limit the function and use scope of this embodiment of the present application.

As shown in FIG. 9, the computer system 600 includes a central processing unit (CPU) 601. The CPU 601 may perform multiple types of appropriate operations and processing according to a program stored in a read-only memory (ROM) 602 or a program loaded from a storage section 608 into a random access memory (RAM) 603. Multiple types of programs and data required for the operations of the system 600 are further stored in the RAM 603. The CPU 601, the ROM 602 and the RAM 603 are connected to each other via a bus 604. An input/output (I/O) interface 605 is also connected to the bus 604.

Components connected to the I/O interface 605 includes: an input section 606 including a keyboard, a mouse and the like; an output section 607 including a liquid crystal display (LCD), a speaker and the like; a storage section 608 including a hard disk and the like; a communication section 609 including a local area network (LAN) card and network interface cards of a modulator-demodulator and the like. The communication section 609 performs communication processing via the Internet and other networks. A driver 610 is also connected to the I/O interface 605 according to needs. A removable medium 611, for example, a semiconductor memory, is equipped on the drive 610 according to needs, so that a computer program read by the drive 10 from the removable medium 611 is installed into the storage section 608 according to needs.

According to the embodiments of the present disclosure, the preceding processes with reference to the flowcharts may be implemented as computer software programs. For example, the embodiments of the present disclosure include a computer program product. The computer program product includes a computer program carried on a computer readable medium. The computer program includes program codes for performing a method shown in a flowchart. In such an embodiment, the computer program may be downloaded and installed from a network via the communication section 609, and/or installed from the removable medium 611. When the computer program is executed by the CPU 601, the preceding functions defined in the method of the present application are performed. In an embodiment, the computer-readable medium of the present application may be a computer-readable signal medium, a computer-readable storage medium, or any combination of the computer-readable signal medium and the computer-readable storage medium. For example, the computer-readable storage medium may be, but not limited to, a system, an apparatus or a device of electrical, magnetic, optical, electromagnetic, infrared or semiconductor, or any combination thereof. The computer-readable storage medium may include, but is not limited to, an electrical connection having one or more wires, a portable computer disk, a hard disk, a RAM, a ROM, an erasable programmable read-only memory (EPROM) or flash memory, an optical fiber, a portable compact disk read-only memory (CD-ROM), an optical memory device, a magnetic memory device, or any appropriated combination thereof. In this application, the computer-readable storage medium may be any tangible medium containing or storing a program. The program may be used by an instruction execution system, apparatus or device, or used in conjunction with the instruction execution system, apparatus or device. In this application, the computer-readable signal medium may include a data signal propagating in baseband or as a part of a carrier wave. The data signal carries computer-readable program codes. Such a propagated data signal may take a variety of forms that include, but are not limited to, an electromagnetic signal, an optical signal, or any appropriate combination thereof. The computer-readable signal medium may further be any computer-readable medium other than the computer-readable storage medium. The computer-readable medium may send, propagate, or transmit the program used by the instruction execution system, apparatus or device, or used in conjunction with the instruction execution system, apparatus or device. The program codes contained in the computer-readable medium may be transmitted by using any appropriate medium. The appropriate medium includes, but is not limited to, wireless, wires, optical fibers, radio frequency (RF) and other media, or any appropriate combination thereof.

The flowcharts and block diagrams in the drawings illustrate possible architectures, functions and operations of the systems, methods, and computer program products according to the embodiments of the present application. In this regard, each block in the flowcharts or the block diagrams may represent a module, a program segment, or a part of codes. The module, the program segment, or the part of codes contains one or more executable instructions for implementing specified logical functions. It is also to be noted that each block in the block diagrams and/or the flowcharts, and combinations of blocks in the block diagrams and/or the flowcharts may be implemented by not only a specific-purpose hardware-based system that performs specified functions or actions, but also combinations of specific-purpose hardware and computer instructions.

Related unit described in the embodiments of the present application may be implemented by software or hardware. The described units may be disposed in a processor. For example, such configuration may be described as "a processor includes a setting unit, a starting unit and a transmission unit". Each name of the respective unit does not constitute a limitation to the respective unit in a certain case. For example, the setting unit may further be described as "a unit for setting playback progress of an audio player". As another example, the processor may be described as "a processor including a first starting unit, a setting unit, a second starting unit and a transmission unit". Each name of the respective unit does not constitute a limitation to the respective unit in a certain case. For example, the first starting unit may further be described as "a unit for starting a video coder".

In another aspect, the present application further provides a computer-readable medium. The computer-readable medium may be contained in the apparatus described in the embodiments described above, or may be separate without being fitted into the apparatus. The computer-readable medium carries one or more programs. When the one or more programs are executed by the apparatus, the apparatus performs the following steps: in response to detecting a resume recording instruction, determining duration of a video coded by a video coder, and setting playback progress of an audio player to the duration, where the resume recording instruction is used for instructing to continue collecting video data and continue playing target audio data by using the audio player; starting the video coder and the audio player in turn; in the case of playing the target audio data to the playback progress, in response to collecting the video data, transmitting the collected video data to the video coder so that the video coder codes the collected video data. Alternatively, when the one or more programs are executed by the apparatus, the apparatus performs the following steps: starting a video coder; in response to detecting a resume recording instruction, determining duration of a coded video, and setting playback progress of an audio player to the duration, where the resume recording instruction is used for instructing to continue collecting video data and continue playing target audio data by using the audio player; starting the audio player; in the case of playing the target audio data to the playback progress, in response to collecting the video data, transmitting the collected video data to the video coder so that the video coder codes the collected video data.

What is claimed is:

1. A video recording method, comprising:
in response to detecting a resume recording instruction, determining a duration of a video encoded by a video encoder, and setting playback progress of an audio player to the duration, wherein the resume recording instruction is used for instructing to continue collecting video data and to continue playing target audio data by using the audio player;
starting the audio player, wherein the video encoder is started before the audio player is started; and
in a case that the target audio data is played to the playback progress, in response to collecting the video data, transmitting the collected video data to the video encoder so that the video encoder encodes the collected video data.

2. The method of claim 1, further comprising:
in response to detecting a stop recording instruction, stopping transmitting the collected video data to the video encoder, controlling the audio player to stop playing, and controlling the video encoder to stop encoding.

3. The method of claim 2, wherein after controlling the video encoder to stop encoding in response to detecting the stop recording instruction, the method further comprises:
determining total duration of video data encoded by the video encoder; and determining the total duration as final playback progress of the audio player.

4. The method of claim 3, wherein after determining the total duration as the final playback progress of the audio player, the method further comprises:
taking played target audio data indicated by the final playback progress as a target audio data interval, and extracting the target audio data interval; and
storing the encoded video data and the target audio data interval.

5. The method of claim 2, wherein after controlling the video encoder to stop encoding in response to detecting the stop recording instruction, the method further comprises:
determining total duration of video data encoded by the video encoder;
determining the total duration as final playback progress of the audio player; and
starting the video encoder.

6. The method of claim 1, further comprising:
before playing the target audio data to the playback progress, in response to collecting the video data, deleting the collected video data.

7. The method of claim 1, wherein in a case of starting the video encoder after responding to detecting the resume recording instruction and before starting the audio player, the method further comprises:
in response to detecting the resume recording instruction, setting pre-established encoding identification to a first preset value, wherein the first preset value is used for instructing to delete the currently collected video data.

8. The method of claim 7, further comprising:
in the case of playing the target audio data to the playback progress, setting the pre-established encoding identification to a second preset value, wherein the second preset value is used for instructing to transmit the currently collected video data to the video encoder.

9. The method of claim 8, further comprising:
in response to detecting a stop recording instruction, setting the pre-established encoding identification to the first preset value.

10. The method of claim 1, wherein in a case of starting the video encoder before responding to detecting the resume recording instruction, before starting the video encoder, the method further comprises:
setting pre-established encoding identification to a first preset value, wherein the first preset value is used for instructing to delete the currently collected video data.

11. A terminal device, comprising: at least one processor and a storage apparatus, which is configured to store at least one program, wherein when executing the at least one program, the at least one processor performs:
in response to detecting a resume recording instruction, determining a duration of a video encoded by a video encoder, and setting playback progress of an audio player to the duration, wherein the resume recording instruction is used for instructing to continue collecting video data and to continue playing target audio data by using the audio player;
starting the audio player, wherein the video encoder is started before the audio player is started; and
in a case that the target audio data is played to the playback progress, in response to collecting the video data, transmitting the collected video data to the video encoder so that the video encoder encodes the collected video data.

12. The terminal device of claim 11, wherein the at least one processor is further configured to perform:
in response to detecting a stop recording instruction, stopping transmitting the collected video data to the video encoder, controlling the audio player to stop playing, and controlling the video encoder to stop encoding.

13. The terminal device of claim 12, wherein after controlling the video encoder to stop encoding in response to detecting the stop recording instruction, the at least one processor is further configured to perform:
determining total duration of video data encoded by the video encoder; and
determining the total duration as final playback progress of the audio player.

14. The terminal device of claim 13, wherein after determining the total duration as the final playback progress of the audio player, the at least one processor is further configured to perform:
taking played target audio data indicated by the final playback progress as a target audio data interval, and extracting the target audio data interval; and
storing the encoded video data and the target audio data interval.

15. The terminal device of claim 12, wherein after controlling the video encoder to stop encoding in response to the detecting the stop recording instruction, the at least one processor is further configured to perform:
determining total duration of video data encoded by the video encoder;
determining the total duration as final playback progress of the audio player; and
starting the video encoder.

16. The terminal device of claim 11, wherein the at least one processor is further configured to perform:
before playing the target audio data to the playback progress, in response to collecting the video data, deleting the collected video data.

17. The terminal device of claim 11, wherein in a case of starting the video encoder after responding to detecting the resume recording instruction and before starting the audio player, the at least one processor is further configured to perform:

in response to detecting the resume recording instruction, setting pre-established encoding identification to a first preset value, wherein the first preset value is used for instructing to delete the currently collected video data.

18. The terminal device of claim 17, wherein the at least one processor is further configured to perform:

in the case of playing the target audio data to the playback progress, setting the pre-established encoding identification to a second preset value, wherein the second preset value is used for instructing to transmit the currently collected video data to the video encoder.

19. The terminal device of claim 11, wherein in a case of starting the video encoder before responding to detecting the resume recording instruction, before starting the video encoder, the at least one processor is further configured to perform:

setting pre-established encoding identification to a first preset value, wherein the first preset value is used for instructing to delete the currently collected video data.

20. A non-transitory computer-readable medium, which stores computer programs, wherein when executing the computer programs, a processor performs:

in response to detecting a resume recording instruction, determining a duration of a video encoded by a video encoder, and setting playback progress of an audio player to the duration, wherein the resume recording instruction is used for instructing to continue collecting video data and to continue playing target audio data by using the audio player;

starting the audio player, wherein the video encoder is started before the audio player is started; and in a case that the target audio data is played to the playback progress, in response to collecting the video data, transmitting the collected video data to the video encoder so that the video encoder encodes the collected video data.

* * * * *